(12) United States Patent
Dawkins et al.

(10) Patent No.: US 6,886,064 B2
(45) Date of Patent: Apr. 26, 2005

(54) COMPUTER SYSTEM SERIALIZATION CONTROL METHOD INVOLVING UNLOCKING GLOBAL LOCK OF ONE PARTITION, AFTER COMPLETION OF MACHINE CHECK ANALYSIS REGARDLESS OF STATE OF OTHER PARTITION LOCKS

(75) Inventors: George John Dawkins, Austin, TX (US); Prakash Vinodrai Desai, Round Rock, TX (US); Van Hoa Lee, Cedar Park, TX (US); Gordon D. McIntosh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/112,477

(22) Filed: Mar. 28, 2002

(65) Prior Publication Data

US 2003/0208670 A1 Nov. 6, 2003

(51) Int. Cl.⁷ .............................................. G06F 15/00
(52) U.S. Cl. .................. 710/200; 710/108; 710/110; 709/210; 709/211; 709/215; 709/248; 707/8
(58) Field of Search ................................. 710/200–220, 710/104–110; 707/8–10, 200–204, 100–103; 709/201–203, 208–216, 223–228, 248

(56) References Cited

U.S. PATENT DOCUMENTS

| | | | | |
|---|---|---|---|---|
| 5,442,763 A | * | 8/1995 | Bartfai et al. ............... | 711/145 |
| 5,596,754 A | * | 1/1997 | Lomet ......................... | 710/200 |
| 5,872,981 A | * | 2/1999 | Waddington et al. ........ | 710/200 |
| 6,041,384 A | * | 3/2000 | Waddington et al. ........ | 710/200 |
| 6,105,026 A | * | 8/2000 | Kruglikov et al. ............. | 707/8 |
| 6,108,654 A | * | 8/2000 | Chan et al. ..................... | 707/8 |
| 6,240,414 B1 | * | 5/2001 | Beizer et al. ................... | 707/8 |
| 6,247,025 B1 | * | 6/2001 | Bacon ......................... | 707/206 |
| 6,330,656 B1 | | 12/2001 | Bealkowski et al. .......... | 712/13 |
| 6,332,180 B1 | * | 12/2001 | Kauffman et al. .......... | 711/153 |
| 6,334,177 B1 | | 12/2001 | Baumgartner et al. ........ | 712/13 |
| 6,336,134 B1 | | 1/2002 | Varma ......................... | 709/205 |
| 6,370,529 B1 | * | 4/2002 | Kruglikov et al. ............. | 707/8 |
| 6,754,656 B1 | * | 6/2004 | Cornwell et al. .............. | 707/8 |

* cited by examiner

Primary Examiner—Paul R. Myers
Assistant Examiner—Raymond N Phan
(74) Attorney, Agent, or Firm—Synnestvedt & Lechner LLP; Mark McBurney (57) ABSTRACT

In a computer system having a logical-partitioned server, each partition of the server is provided with its own separate lock and access corridor, in addition to a global lock. When the locking of a partition lock is followed by the locking of the global lock, the system is serialized. The partition locks are controlled by system firmware on behalf of an OS isolating each partition; however, the global lock is controlled by the system firmware to be unlocked independent of the lock/unlock status of the partition locks. In this manner, the ability or inability of an OS that issued a machine check interrupt to unlock its partition lock after the machine check analysis is complete is irrelevant; once the machine check analysis is complete, the system firmware unlocks the global lock, giving other partitions access to shared system resources to run their own machine checks.

17 Claims, 10 Drawing Sheets

COMPUTER SYSTEM SERIALIZATION CONTROL METHOD INVOLVING UNLOCKING GLOBAL LOCK OF ONE PARTITION, AFTER COMPLETION OF MACHINE CHECK ANALYSIS REGARDLESS OF STATE OF OTHER PARTITION LOCKS

BACKGROUND OF THE INVENTION

1. Field of the Invention

The present invention relates to logical-partitioned (LPAR) servers, and more particularly to systems and methods for effecting serialization in logical-partitioned systems in an effective and efficient manner.

2. Description of the Related Art

Multiprocessor computer systems are well known in the art, and provide for increased processing capability by allowing processing paths to be divided among several different system processors. More recently, symmetric multiprocessor (SMP) systems have been partitioned to behave as multiple independent computer systems. For example, a single system having eight processors might be configured to treat each of the eight processors (or multiple groups of one or more processors) as a separate system for processing purposes. Each of these "virtual" systems would have its own copy of an operating system, and may then be independently assigned tasks, or may operate together as a processing cluster, which provides for both high speed processing and improved reliability.

Most major computer companies developed partitioned systems as it became clear that there was benefit to consolidating multiple systems into a single system. For example, IBM started partitioning its S/370 mainframe systems in the 1970's. Since then, logical partitioning on IBM mainframes has evolved from a predominantly physical partitioning scheme, based on hardware boundaries, to one that allows for virtual and shared resources with dynamic load balancing. In 1999, IBM implemented LPAR support on the AS/400 platform, and in 2000, IBM announced the ability to run the LINUX operating system in an LPAR on its zSeries server.

In 2001, IBM introduced its pSeries 690 server, which also utilized logical partitioning. The architectural design of the pSeries 690 brought logical partitioning to the UNIX world, being capable of creating up to 16 partitions inside a single server, with greater flexibility and resource selection.

Partly as a result of these advancements, servers now exist to provide the performance, scalability, and reliability required in "mission critical environments." These servers run corporate applications, such as enterprise resource planning (ERP), business intelligence (BI), and high performance e-business infrastructures. Proper operation of these systems can be critical to the operation of an organization and it is therefore of the highest importance that they operate efficiently and as error-free as possible, and rapid problem analysis and recovery from system errors is vital.

In normal operation, a partitioned system operates in parallel, that is, the operations being performed by the partitions can occur simultaneously as the partitions share the operational resources of the server. With everything functioning properly, the various partitions, which may be operating using different operating systems (e.g., partition 1 might be using AIX by IBM while partition 5 might be using LINUX by Redhat), perform their functions simultaneously.

There are certain critical functions, however, that require serialization of the system for a short period of time. Serialization is the forcing of operations to occur in a serial, rather than parallel, fashion, even when the operations could be performed in parallel. Serialization is typically mandatory when the correctness of the computation depends upon or might depend upon the exact order of computation, or when an operation requires uninterrupted use of otherwise shared hardware resources (e.g., registers) for a brief time period.

One example of such a condition involves handling machine-check interrupts as a result of hardware errors. A "machine check" is an interrupt process that is initiated by a processor during operation. That is, a processor, via its normal use of executing instructions, may cause a machine check interrupt (by executing errant instructions) or experience a machine check interrupt (by executing ordinary instructions to a piece of hardware that is in an errant state). For example, a machine-check interrupt will be generated by a processor when the processor experiences an internal cache parity error; when it reads a memory location containing an uncorrectable error; when it reads an I/O device experiencing an error condition. The machine-check interrupt is non-maskable and needs immediate attention of the processor. The processor takes action by interrupting the current instruction stream (thread), saving the address and the machine-state of the interrupt thread, and executing the machine-check interrupt handler inside a "hypervisor." A hypervisor is system firmware that, among other things, controls the coordination between the processors and the hardware analysis system such as the machine-check interrupt handlers.

The hypervisor provides a machine check analysis process used by the machine check interrupt handler to identify the encountered error. The machine check analysis process involves "walking through the hardware" checking the function of registers, buffers, and the like, many of which are shared by all partitions during normal operations. The data resulting from this analysis is sent to various logging registers. For the machine check handler to be able to analyze the problem, the error status registers of the shared hardware must not be disturbed while the machine check analysis is in progress, and the logging registers must only be used by the processor running the machine check analysis. To assure this exclusive use of these registers during the machine check, the system is serialized to prevent a second (or third, fourth, etc.) processor, that also has taken a machine check interrupt, from trying to invoke the machine check analysis while it is in use by the first processor. This is typically accomplished using a known global "software lock," as described in more detail below.

While the first processor is in the machine check analysis, if a second processor takes a machine check interrupt, it has to wait for the first one to finish the machine check analysis and unlock the global software lock. Completion of the machine check includes reporting the results of the analysis in an error log to the OS of the partition initiating the machine check interrupt, and waiting for the OS to acknowledge the capture of the error log. If this partition OS does not send the acknowledgement, the lock will remain locked indefinitely. Thus, as more and more partitions' processors are put into the wait state waiting for the global software lock to be unlocked so that they can run their respective machine checks, they are unable to function. This can eventually result in the entire system coming to a halt, which is an unacceptable outcome for a mission critical system or other systems on which large numbers of users depend.

Figure 1:
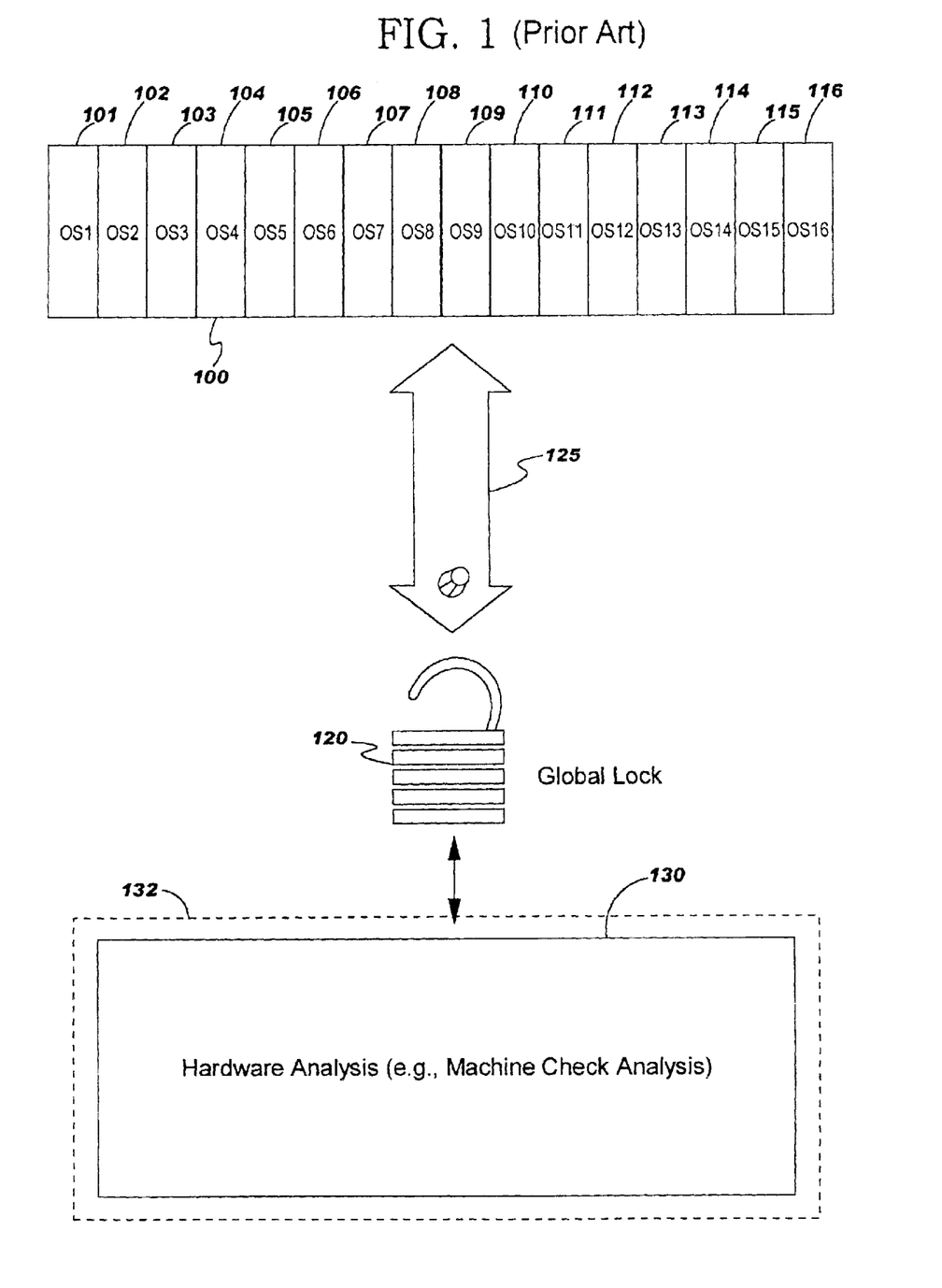
FIG. 1 is a block diagram illustrating the normal operation of a prior art partitioned system.
Figure 2:
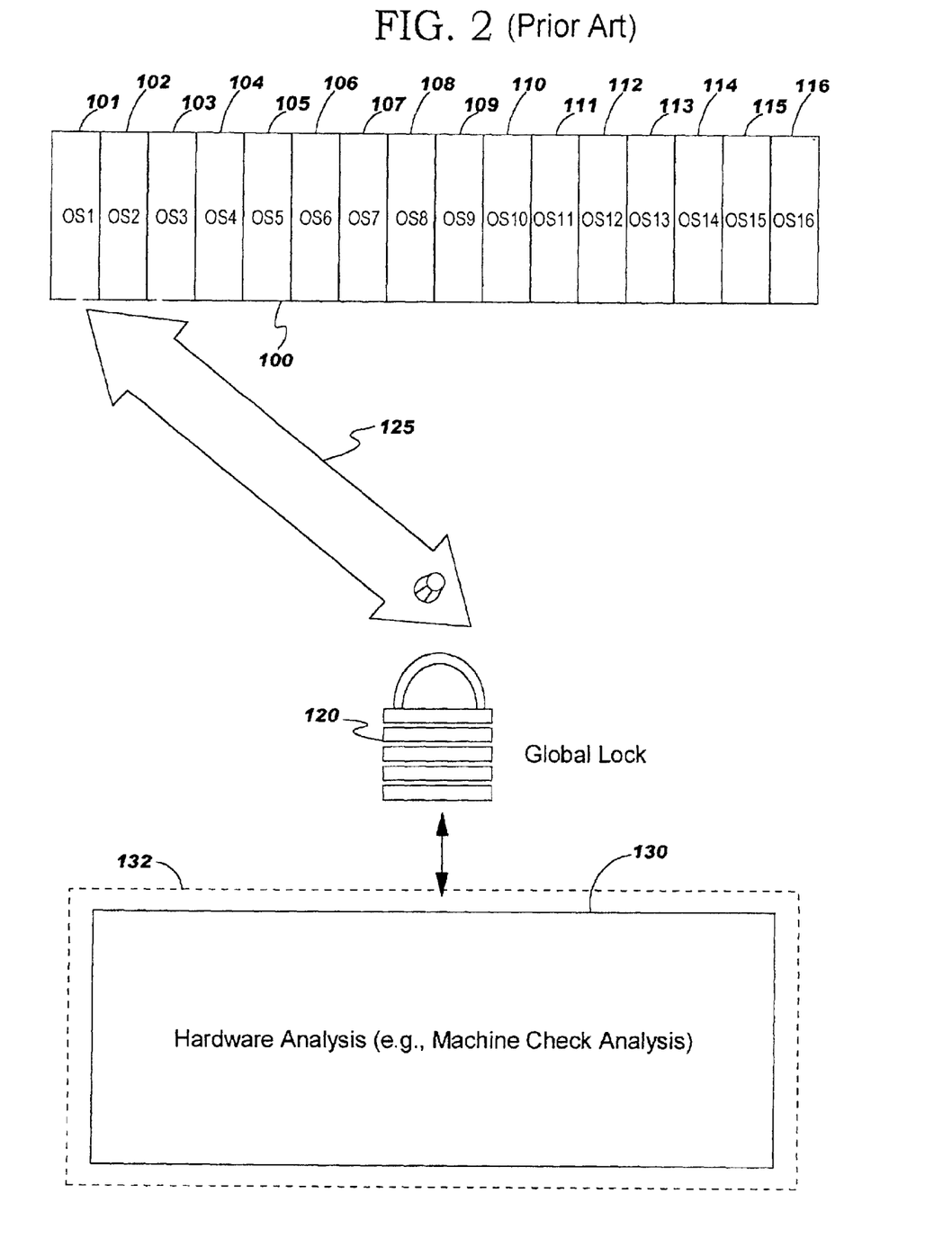
FIG. 2 is a block diagram illustrating the system of FIG. 1 when partition 101 has encountered a fault condition.
Figure 3:
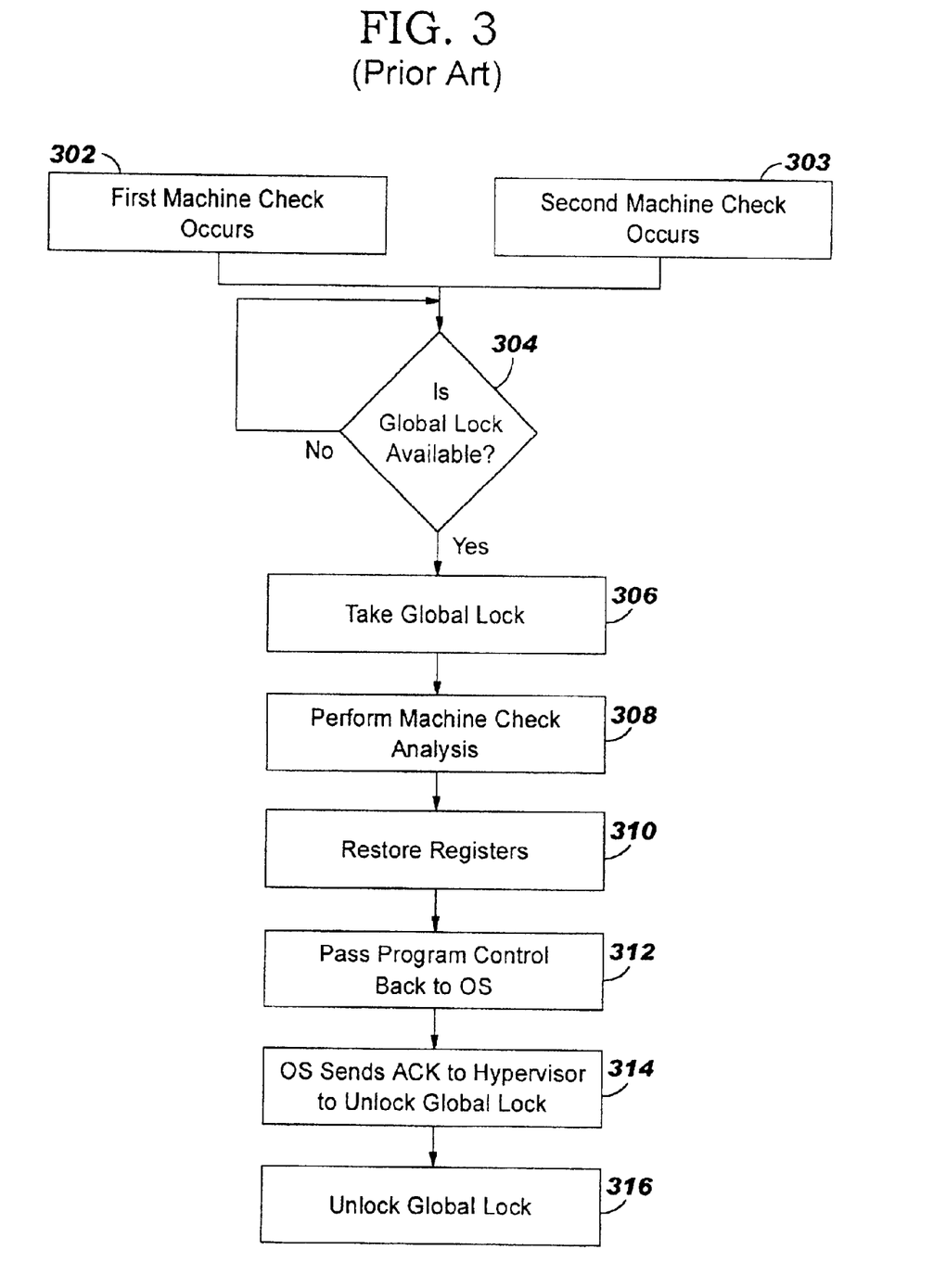
FIG. 3 is a flowchart illustrating the operation of the system of FIGS. 1 and 2 during a series of sequentially occurring machine checks.

FIGS. 1–3 illustrate a simplified example of the locking process involved in a prior art system. FIG. 1 is a block diagram illustrating the normal operation of a prior art partitioned system. Referring to FIG. 1, a server 100 is partitioned into sixteen partitions 101–116. It is understood that sixteen partitions are illustrated for the purposes of example only, and that any number of partitions may be used. Operating Systems OS1 through OS16 are used by partitions 101–116, respectively. OS1–OS16 may all be the same operating system, or various combinations of different operating systems. A hardware analysis system 130 of the hypervisor 132 is utilized for performing a check of the system (e.g., machine check analysis) when an error occurs. A single pathway or "corridor" 125 is made available so that at any given time, one processor from one of the partitions can access the hardware analysis system 130. For illustrative purposes, corridor 125 is illustrated conceptually as a pivoting pathway in the shape of an arrow. This is done to illustrate the concept only and is not intended to illustrate the actual routing between server 100 and the hardware analysis system 130. The actual configuration is well known to one of ordinary skill in the art and is not discussed further herein.

A global lock 120 (e.g., a software lock) is provided to effect the serialization required during a machine check, as described in more detail below. In FIG. 1, global lock 120 is shown illustratively in an unlocked position, indicating that the system 100 is operating properly and in an unserialized state.

FIG. 2 is a block diagram illustrating the system of FIG. 1 when partition 101 has encountered a fault condition. Referring to FIG. 2, if operating system OS1 of partition 101 experiences a fault condition, OS1 "takes" a machine check and appropriates corridor 125 so that it can have access to hardware analysis portion 130. This is illustrated by showing corridor 125 pivoted to point to OS1 of partition 101.

So that no other partitions can use the system resources required for the machine check while it is occurring (i.e., to serialize the system), global lock 120 is locked as shown in FIG. 2. While in this locked position, none of the other partitions have access to corridor 125 and they cannot perform machine check analysis. If another partition, OS, e.g., OS5 of partition 105, experiences a fault and also wishes to perform a machine check analysis, it must wait until OS1 is completed with its machine check analysis. While in this waiting state, the waiting partition cannot perform any functions; it is paused, waiting for its turn to run the machine check analysis. Global lock 120 remains locked until it receives a command from OS1 (in this example) indicating that the machine check is completed, and the lock can then be unlocked for use by others.

The above-described system operates sufficiently as long as OS1 is able to issue the command to unlock the global lock 120. However, certain circumstances may occur which prevent OS1 from doing so. For example, if OS1 experiences an error condition while trying to send the acknowledgement to the hypervisor that causes it to circulate in a loop, it will circulate through the loop indefinitely and thus the command to unlock global lock 120 will never be issued. As additional operating systems experience machine checks, they are placed in waiting states, unable to perform their "mission critical" tasks; if this continues, eventually the entire system will "hang" and be inoperable.

FIG. 3 is a flowchart illustrating the operation of the system of FIGS. 1 and 2 during a series of sequentially occurring machine checks. At step 302, a first machine check occurs. At step 304 a determination is made as to whether or not the global lock is available, i.e., is in the unlocked state. Since, in this example, this is the first machine check occurrence, the determination will be in the affirmative and the process proceeds to step 306, where the global lock is taken to lock all other operating systems/partitions out of the machine check analysis process and thereby serialize the system while the first machine check analysis is in process. At step 308, the machine check analysis is performed. At step 310, the registers are restored to their status at the time of the interrupt.

At step 312, the machine check interrupt handler of the system passes control back to the operating system. This is essentially a signal to the operating system that the hardware analysis portion has performed its analysis, fixed a recoverable error or isolated the faulty hardware device, and the system is ready to go back to its parallel operating state. At step 314, captures the error log into non-volatile hard disk storage. At step 316, the operating system sends an acknowledgement to the hypervisor indicating the error capture of the log, and then the hypervisor issues the command to unlock the global lock.

If a second machine check occurs (step 303) before the operating system that initiated the first machine check has unlocked the global lock, then when the second machine check proceeds to the query of step 304 ("Is global lock available?"), the response will be in the negative, and the process will revert back into a loop to continue processing the query of step 304 until the global lock is available. During this process, the partition and operating system that initiated the second machine check is in a paused state and is not operating. As mentioned above, if the partition/operating system that initiated the first machine check is unable to, or simply fails to unlock the global lock, the second partition/operating system that initiated the second machine check will remain paused indefinitely.

Accordingly, a system and method is needed that will allow other partitions in a partitioned system to have access to machine check analysis when one or more of the other partitions experiences a problem.

SUMMARY OF THE INVENTION

The present invention solves the aforementioned problem by having a hypervisor provide each partition in an LPAR system with its own separate partition lock and access corridor to a hardware analysis system such as a machine check interrupt handler, as well as a global lock to control access to the hardware analysis system on a global level. The partition locks are used to serialize the partitions' access corridors, while the global lock is used only to serialize the hardware analysis system. In this manner, the ability or inability of the OS of a partition to confirm completion of its need for access to the acess corridor is irrelevant to system operation; once the hardware analysis system has completed its task, the hypervisor unlocks the global lock, giving other partitions access to the shared resources to run their own machine check analysis.

DETAILED DESCRIPTION OF THE PREFERRED EMBODIMENTS

The present invention is illustrated in connection with FIGS. 4 through 8. In accordance with the present invention, each partition of an LPAR system and its associated operating system is provided with its own "lockable access corridor," and a global lock is provided to control the serialization of the machine check analysis process controlled by the hypervisor. This configuration allows for each partition to have access to the machine checking analysis process by fairly obtaining the global lock, regardless as to whether or not an operating system has unlocked its individual lockable access corridor.

Figure 4:
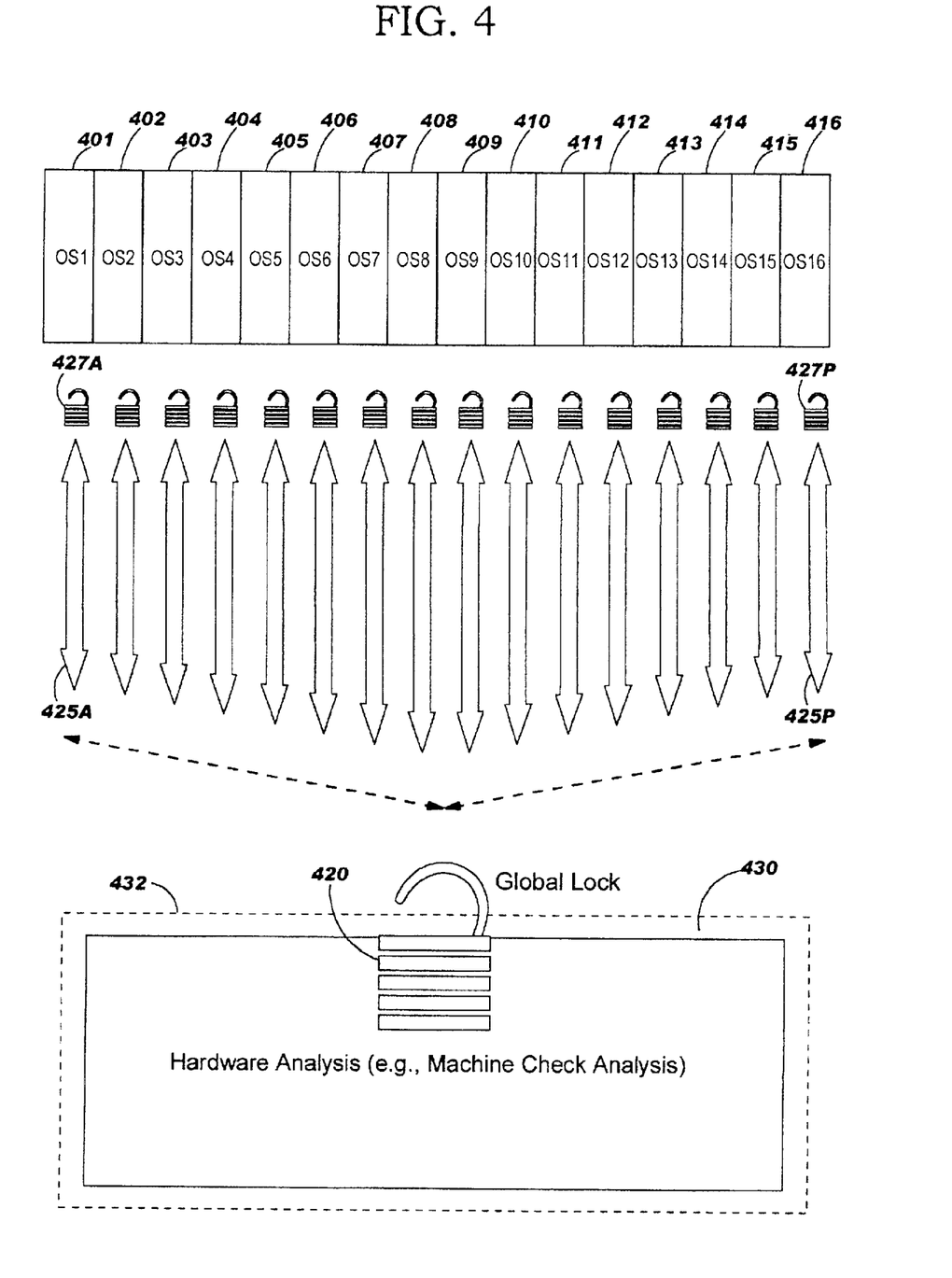
FIG. 4 is a block diagram illustrating the conceptual structure of the present invention during normal operation.

FIG. 4 is a block diagram illustrating the conceptual structure of the present invention during normal operation. Referring to FIG. 4, a server 400 is partitioned into sixteen partitions 401 through 416. It is understood that sixteen partitions are chosen for illustration purpose only, and that any number of partitions may be used. It is further understood that each partition could operate using a different operating system OS1 through OS16. A hardware analysis system 430 of a hypervisor 432 is utilized for performing a check of the system (e.g., machine check analysis) when an error occurs.

In accordance with the present invention, a series of lockable access corridors 425A through 425P are provided, one access corridor for each partition. Likewise, a series of partition locks 427A through 427P are provided, one partition lock per partition. A processor from a partition can lock its partition lock. The partition lock can only be unlocked by the partition's operating system.

A global lock 420 is provided as part of, and controlled by, the system firmware of hypervisor 432, which also controls the operation of the hardware analysis system 430, including a machine check handler and a machine check analysis process.

The state illustrated in FIG. 4 is analogous to the state illustrated in FIG. 1, in that in this state the partitions are operating properly and there is no need for any of the partitions to connect to the hardware analysis system 430 to have the hypervisor control the operation of conducting a machine check.

Figure 5:
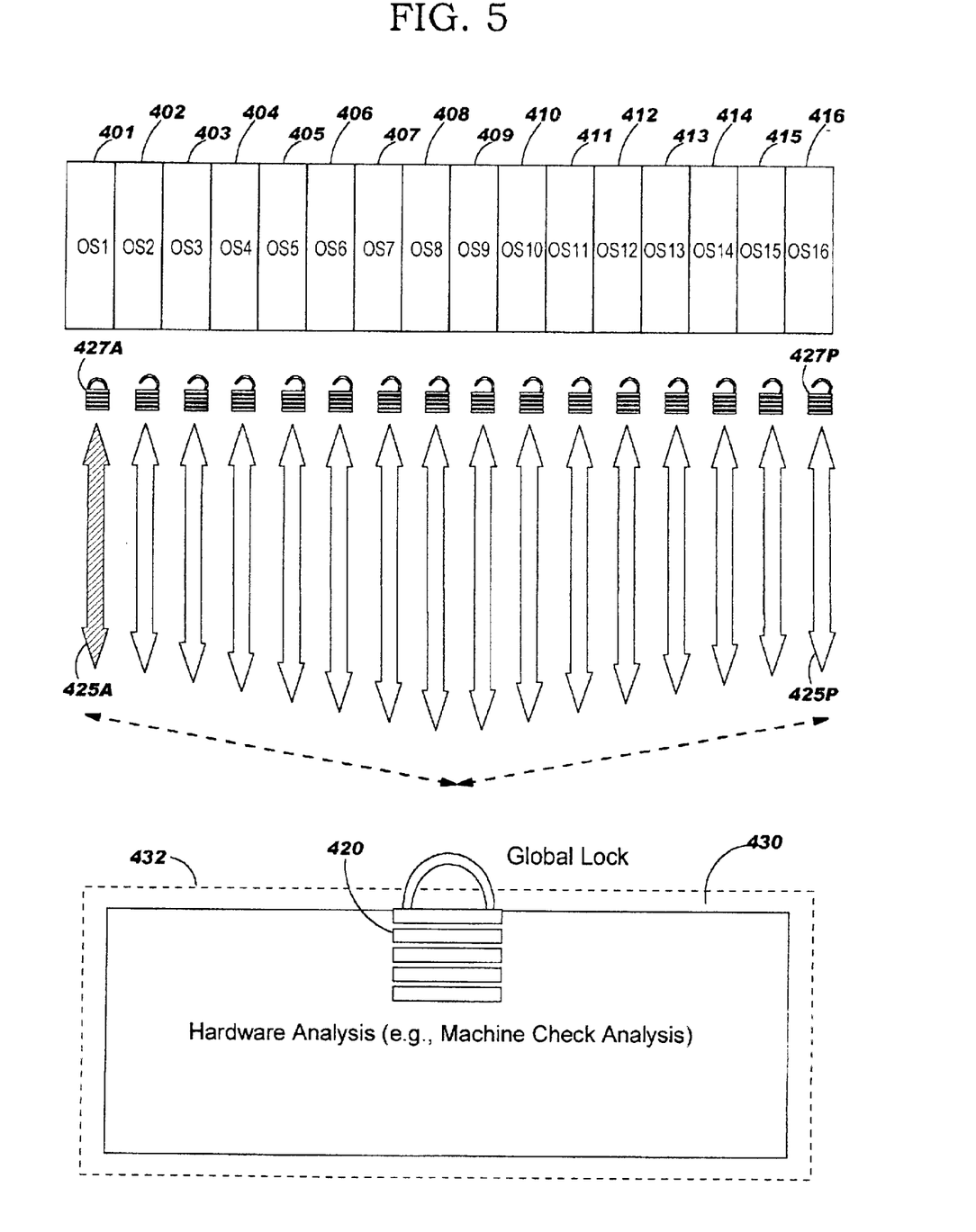
FIG. 5 is a block diagram of the conceptual structure and operation of the present invention in a situation where the OS of partition 401 has experienced a problem that requires that a hardware analysis be performed.

FIG. 5 is a block diagram of the conceptual structure and operation of the present invention in a situation where a processor in partition 401 has experienced a problem that requires that a hardware analysis be performed, e.g., a machine check. As seen in FIG. 5, partition lock 427A is locked, as is global lock 420. The locking of partition lock 427A can only be accomplished by processors from partition 401, and the hypervisor will be allowed to lock global lock 420 only after a processor has successfully locked their corresponding partition locks. Thus, the machine check handler "forces" the obtaining and locking of the partition lock of a processor before allowing the processor to "compete" for the obtaining and locking of the global lock on its behalf. A pathway along corridor 425A is established to provide a path for the data stream required to conduct the hardware analysis. In contrast to the prior art systems, however, once the hardware analysis is completed, global lock 420 is immediately unlocked by the system firmware.

Figure 6:
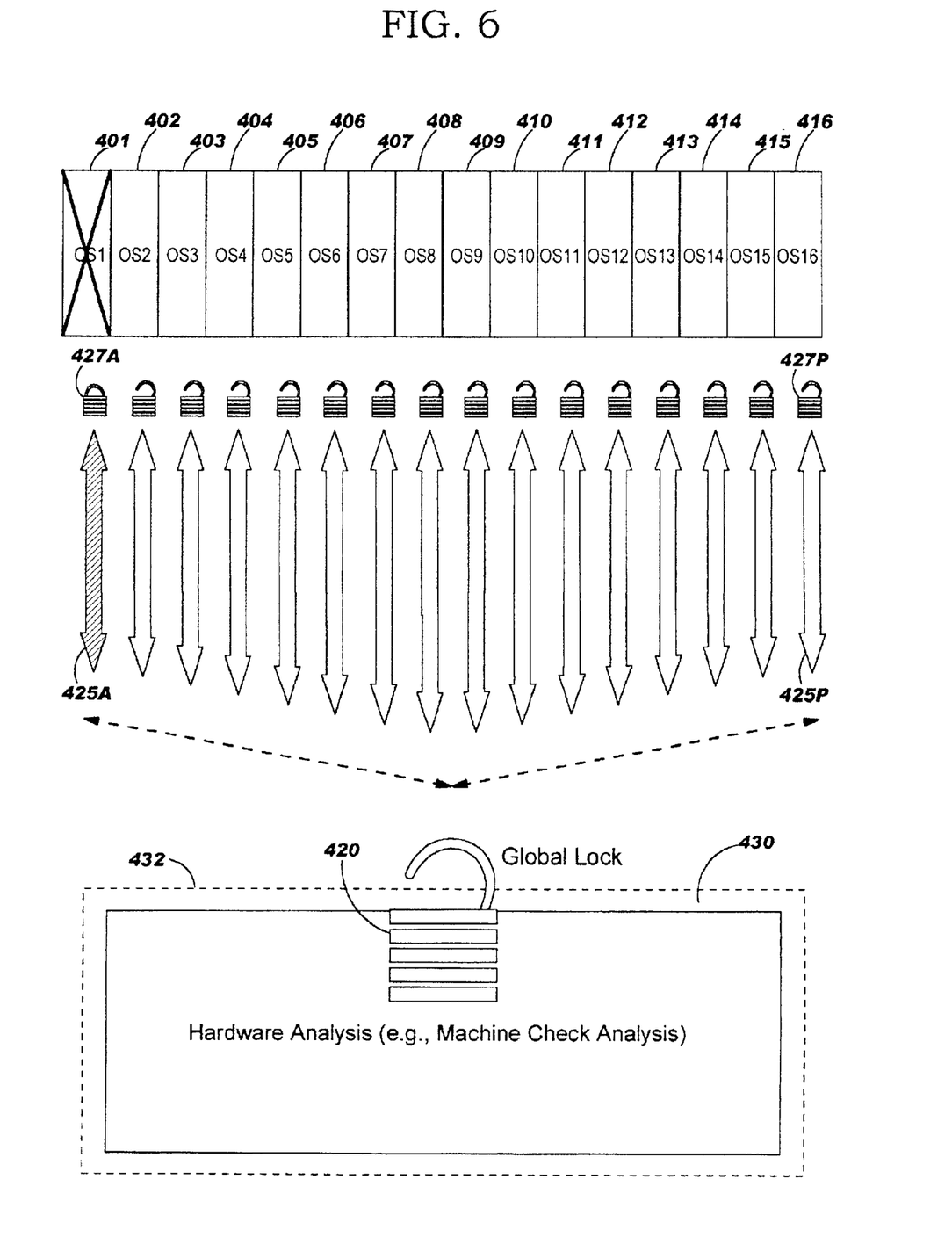
FIG. 6 is a block diagram of the conceptual structure and operation of the present invention when the system firmware has unlocked global lock 420.

FIG. 6 is a block diagram of the conceptual structure and operation of the present invention when the system firmware has unlocked global lock 420. This would occur upon completion of the hardware analysis, e.g., the completion of a machine check analysis. Since the global lock is unlocked without requiring a partition OS acknowledgement, the system is now in a status where it can again perform additional machine check analyses for other partitions, if necessary. Thus, the fact that, for example, OS1 encounters a problem and is unable to unlock partition lock 427A (as illustrated by the "X" through OS1 in FIG. 5) is irrelevant; all of the other partitions 402–416 have access to the hardware analysis portion 430 in the event that the need arises for them to conduct a similar check. In other words, the operating condition of OS1 of partition 401, once the machine check analysis is completed, is completely irrelevant to the operation of the rest of the system. While OS1 may be non-operational, the remaining partitions can continue to operate.

Figure 7:
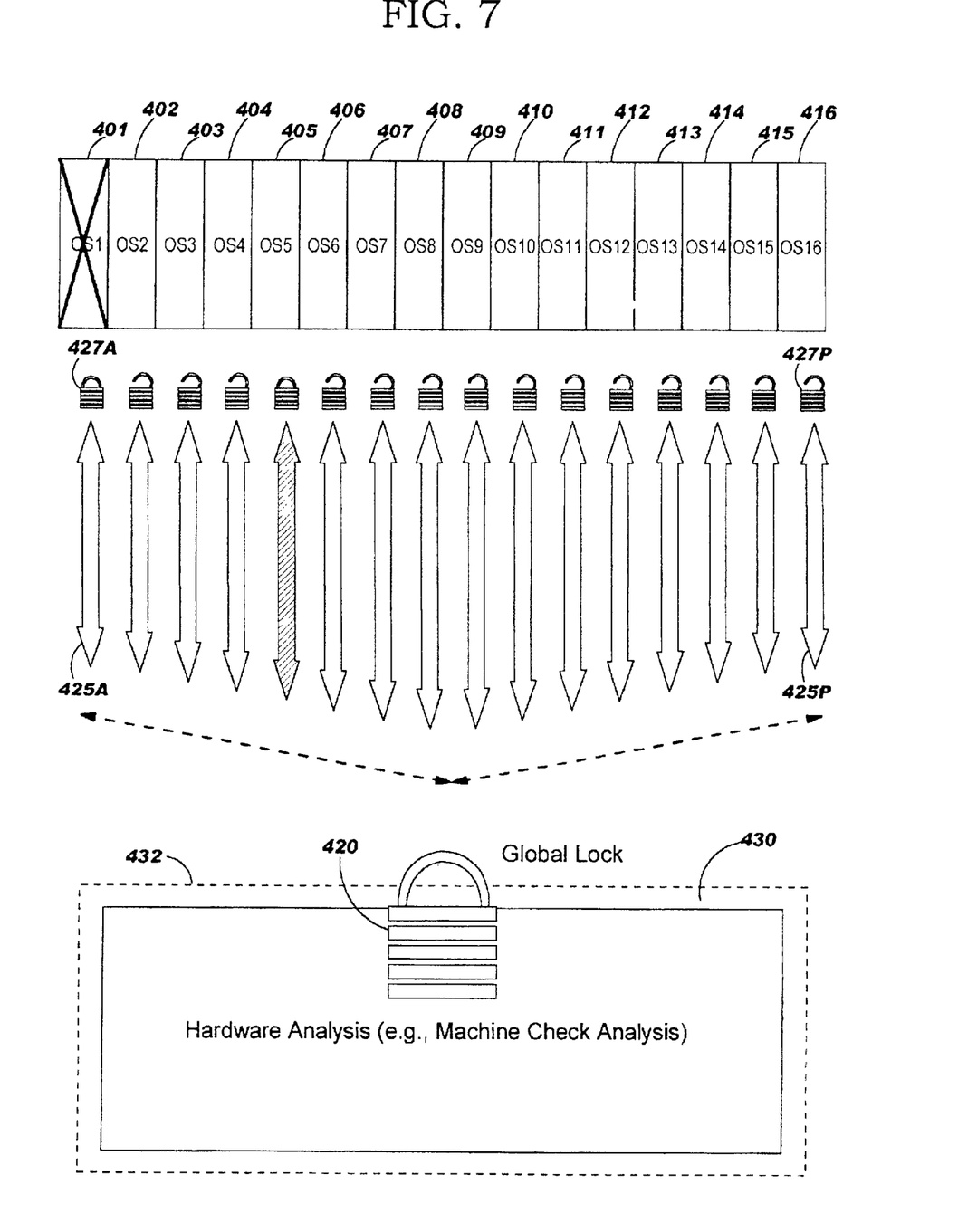
FIG. 7 is a block diagram of the conceptual structure and operation of the present invention when the OS in partition 405 takes a machine check.

FIG. 7 is a block diagram of the conceptual structure and operation of the present invention when the OS in partition 405 generates a machine-check interrupt. As shown in FIG. 7, partition 401, still non-operational, has its partition lock 427A still locked, while partition 405 now has its partition lock 427E locked and global lock 420 has been locked by hypervisor 432. Corridor 425E between partition 405 and hardware analysis system 430 is active for use in connection with machine check analysis of partition 405. As can be seen, this process can continue, without impediment from partition 401, since partition lock 427A of partition 401 is in a locked position.

Figure 8:
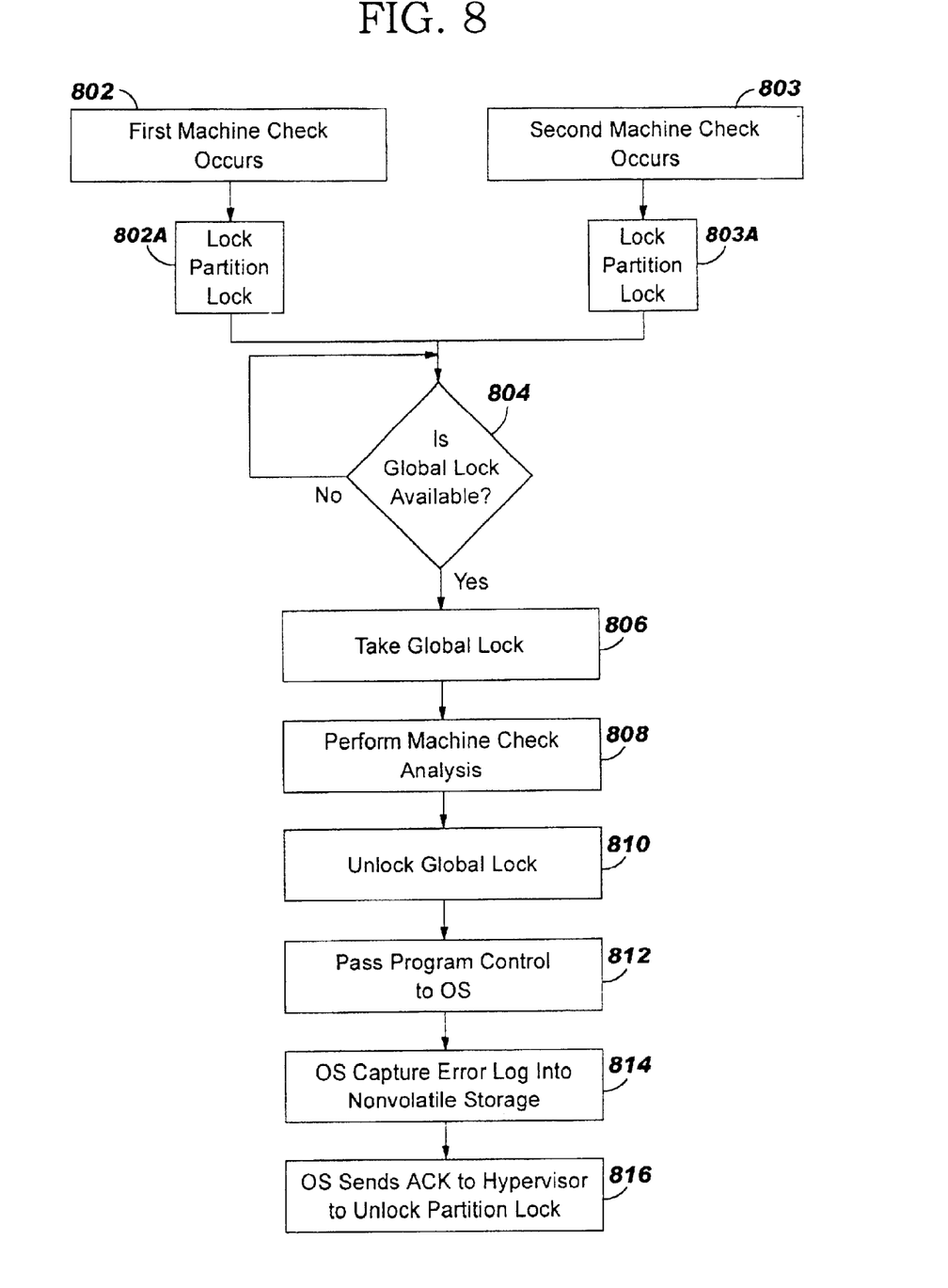
FIG. 8 is a flowchart illustrating an example of the operational steps of the present invention.

FIG. 8 is a flowchart illustrating an example of the operational steps of the present invention. At step 802, a first machine-check interrupt occurs. When this machine-check interrupt occurs, at step 802A, a partition lock associated with the partition issuing the machine check is locked. In the example discussed above, the machine check might be issued by partition 401/operating system OS1 and partition lock 427A, associated with partition 401, would be locked at this step.

The process proceeds to step 804, where a determination is made as to the status of the global lock. If the global lock is unlocked and thus available, the process proceeds to step 806 where the global lock is taken to prevent other partitions from engaging in a machine check analysis. At step 808, the machine check analysis is performed and, once it is completed, at step 810, the hypervisor unlocks the global lock and sends the processing control, with the result of the error analysis, to the active operating system (OS1 in the above example) at step 812. At step 814, the active operating system captures the error analysis into nonvolatile hard disk storage. At step 816, the active operating system sends the acknowledgement to the hypervisor so that the partition lock can be unlocked.

As can be seen, if the operating system is having a problem in step 814 (e.g., hanging in an infinite loop), it will not be able to proceed to step 816 to send the acknowledgement to the hypervisor to enable the unlocking of its partition lock. However, the unlocking of the global lock at step 810 makes it possible for other partitions to process their machine-check interrupts.

When the second machine-check interrupt 803 occurs, it takes its partition lock and locks it at step 803A. The process proceeds to step 804. If, at step 804, it is determined that the global lock is still locked, i.e., unavailable, the process loops around and continues checking until the global lock does become available. Once the global lock becomes available, the process proceeds through steps 806–816 as described above.

Figure 9:
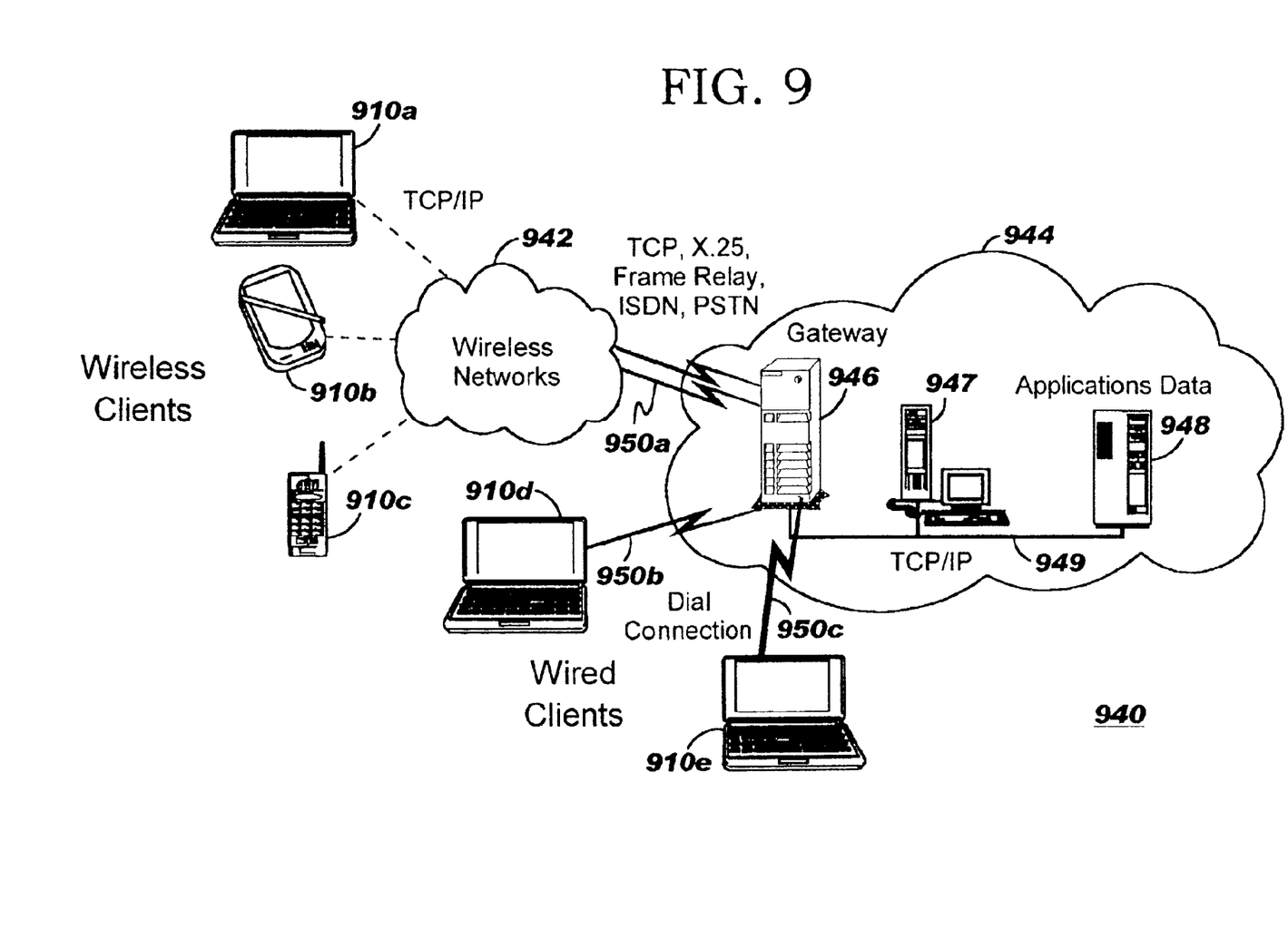
FIG. 9 illustrates an exemplary data processing network 940 in which the present invention may be practiced.

FIG. 9 illustrates an exemplary data processing network 940 in which the present invention may be practiced. The data processing network 940 may include a plurality of individual networks, such as wireless network 942 and network 944, each of which may include a plurality of individual workstations/devices, e.g. 910a, 910b, 910c. Additionally, as those skilled in the art will appreciate, one or more LANs may be included (not shown), where a LAN may comprise a plurality of intelligent workstations coupled to a host processor.

The networks 942 and 944 may also include mainframe computers or servers, such as a gateway computer 946 or application server 947 (which may access a data repository 948). A gateway computer 946 serves as a point of entry into each network 944. The gateway computer 946 may be preferably coupled to another network 942 by means of a communications link 950a. The gateway computer 946 may also be directly coupled to one or more workstations, e.g., 910d, 910e, using a communications link 950b, 950c. The gateway computer 946 may be implemented using any appropriate processor, such as IBM's Network Processor. For example, the gateway computer 946 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390," "Application System/400," and "AS/400" are registered trademarks of IBM.) These are merely representative types of computers with which the present invention may be used.

The gateway computer 946 may also be coupled 949 to a storage device (such as data repository 948). Further, the gateway 946 may be directly or indirectly coupled to one or more workstations/devices 910d, 910e, and servers such as application server 947.

Those skilled in the art will appreciate that the gateway computer 946 may be located a great geographic distance from the network 942, and similarly, the workstations/devices may be located a substantial distance from the networks 942 and 944. For example, the network 942 may be located in California, while the gateway 946 may be located in Texas, and one or more of the workstations/devices 910 may be located in New York. The workstations/devices 910 may connect to the wireless network 942 using a networking protocol such as the Transmission Control Protocol/Internet Protocol ("TCP/IP") over a number of alternative connection media, such as cellular phone, radio frequency networks, satellite networks, etc. The wireless network 942 preferably connects to the gateway 946 using a network connection 950a such as TCP or UDP (User Datagram Protocol) over IP, X.25, Frame Relay, ISDN (Integrated Services Digital Network), PSTN (Public Switched Telephone Network), etc. The workstations/devices 910 may alternatively connect directly to the gateway 946 using dial connections 950b or 950c. Further, the wireless network 942 and network 944 may connect to one or more other networks (not shown), in an analogous manner to that depicted in FIG. 9.

The present invention may be used on a client computer or server in a networking environment, or on a standalone workstation. (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Figure 10:
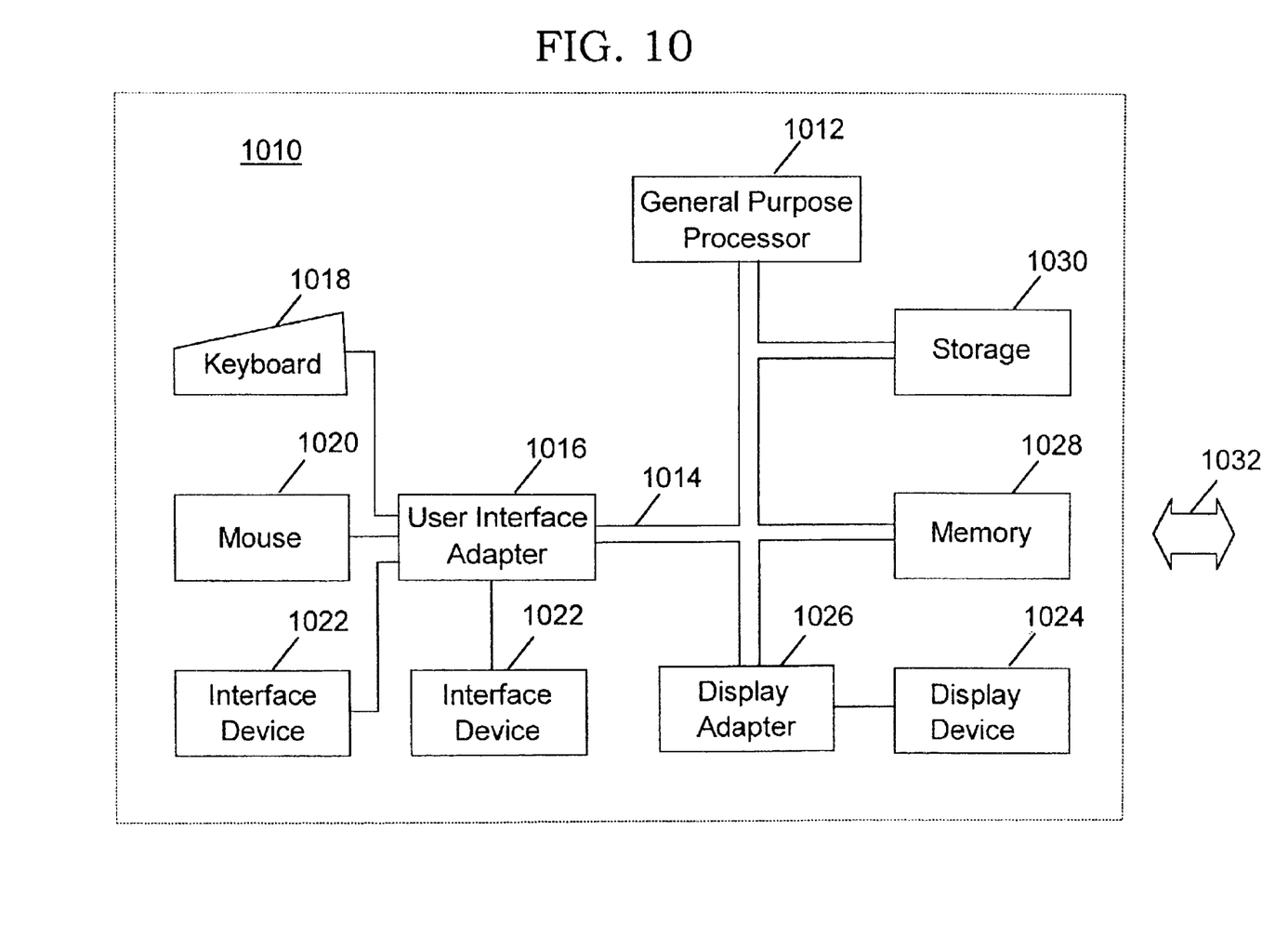
FIG. 10 is a block diagram of a processing device 1010 which may be used to practice the present invention.

FIG. 10 is a block diagram of a processing device 1010 in accordance with the present invention. The exemplary processing device 1010 is representative of workstation 410a or server 446 of FIG. 4, as discussed above. This block diagram represents hardware for a local implementation or a remote implementation.

As is well known in the art, the workstation of FIG. 10 includes a representative processing device, e.g. a single user computer workstation 1010, such as a personal computer, including related peripheral devices. The workstation 1010 includes a general purpose microprocessor 1012 and a bus 1014 employed to connect and enable communication between the microprocessor 1012 and the components of the workstation 1010 in accordance with known techniques. The workstation 1010 typically includes a user interface adapter 1016, which connects the microprocessor 1012 via the bus 1014 to one or more interface devices, such as a keyboard 1018, mouse 1020, and/or other interface devices 1022, which can be any user interface device, such as a touch sensitive screen, digitized entry pad, etc. The bus 1014 also connects a display device 1024, such as an LCD screen or monitor, to the microprocessor 1012 via a display adapter 1026. The bus 1014 also connects the microprocessor 1012 to memory 1028 and long-term storage 1030 (collectively, "memory") which can include a hard drive, diskette drive, tape drive, etc.

The workstation 1010 may communicate with other computers or networks of computers, for example, via a communications channel or modem 1032. Alternatively, the workstation 1010 may communicate using a wireless interface at 1032, such as a CDPD (cellular digital packet data) card. The workstation 1010 may be associated with such other computers in a LAN or a wide area network (WAN), or the workstation 1010 can be a client in a client/server arrangement with another computer, etc. All of these configurations, as well as the appropriate communications hardware and software, are known in the art.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of controlling the serializing of a computer system having a logical-partitioned server operating under the control of a system controller, said logical-partitioned server having plural partitions, said method comprising the steps of:

providing an individual partition lock for each of said plural partitions;

providing a global lock associated with said system controller;

locking said global lock and the individual partition lock associated with a first partition when an operating system (OS) associated with said first partition requests serialization of said computer system to perform a first operation, thereby serializing said computer system on said first operation;

performing said first operation; and unlocking said global lock by said system controller upon completion of said first operation, regardless of the locked/unlocked state of any of said partition locks.

2. A method as set forth in claim 1, further comprising the steps of:

locking the partition lock associated with a second of said plural partitions when an OS associated with said second partition requests serialization of said computer system to perform a second operation;

determining the locked/unlocked state of said global lock; and if said global lock is determined to be unlocked, locking said global lock, thereby serializing said computer system on said second operation;

performing said second operation; and unlocking said global lock upon completion of said second operation, regardless of the locked/unlocked state of any of said partition locks.

3. A method as set forth in claim 2, wherein said steps are repeated whenever a request for serialization is made by any OS=s associated with any of said plural partitions.

4. A method as set forth in claim 2, wherein said system controller comprises a hypervisor.

5. A method as set forth in claim 2, wherein said first operation comprises a machine-check analysis.

6. A method as set forth in claim 5, wherein said second operation comprises a machine check analysis.

7. A method of managing the handling of machine checks in a logical-partitioned server operating under the control of a system controller, said logical-partitioned server having plural partitions, said method comprising the steps of:

providing a discrete lockable access corridor between each said partition and said system controller, the locked/unlocked state of each discrete lockable access corridor being controlled by its associated partition;

providing a global lock associated with said system controller;

locking said global lock and the discrete lockable access corridor associated with a first of said plural partitions when an operating system (OS) associated with said first of said plural partitions issues a machine-check interrupt;

performing a first machine check analysis based on said machine check interrupt issued by said OS of said first partition; and unlocking said global lock by said system controller upon completion of said first machine check analysis, regardless of the locked/unlocked state of any of said discrete lockable access corridors.

8. A method as set forth in claim 7, further comprising the steps of:

locking the discrete access corridor associated with a second of said plural partitions when an OS associated with said second partition issues a machine-check interrupt;

determining the locked/unlocked state of said global lock; and if said global lock is determined to be unlocked, locking said global lock, thereby connecting said second partition and said system controller along the discrete access corridor associated with said second partition;

performing a second machine check analysis based on said machine check interrupt issued by said OS of said second partition; and unlocking said global lock upon completion of said second machine check analysis, regardless of the locked/unlocked state of any of said discrete lockable access corridors.

9. A method as set forth in claim 8, wherein said steps are repeated whenever a request for serialization is made by any OS=s associated with any of said plural partitions.

10. A method as set forth in claim 8, wherein said system controller comprises a hypervisor.

11. A system of managing the handling of machine checks in a logical-partitioned server operating under the control of a system controller, said logical-partitioned server having plural partitions, said system comprising:

means for providing a discrete lockable access corridor between each of said plural partitions and said system controller, the locked/unlocked state of each discrete lockable access corridor being controlled by its associated partition;

means for providing a global lock associated with said system controller;

means for locking said global lock and the discrete lockable access corridor associated with a first of said plural partitions when an operating system (OS) associated with said first of said plural partitions issues a machine-check interrupt;

means for performing a first machine check analysis based on said machine check interrupt issued by said OS of said first partition; and means for unlocking said global lock by said system controller upon completion of said first machine check analysis, regardless of the locked/unlocked state of any of said discrete lockable access corridors.

12. A system as set forth in claim 11, further comprising:

means for locking the discrete access corridor associated with a second of said plural partitions when an OS associated with said second partition issues a machine-check interrupt;

means for determining the locked/unlocked state of said global lock; and means for locking said global lock if said global lock is determined to be unlocked, thereby connecting said second partition and said system controller along the discrete access corridor associated with said second partition;

means for performing a second machine check analysis based on said machine check interrupt issued by said OS of said second partition; and means for unlocking said global lock upon completion of said second machine check analysis, regardless of the locked/unlocked state of any of said discrete lockable access corridors.

13. A system as set forth in claim 12, wherein said system controller comprises a hypervisor.

14. A computer program product recorded on a computer readable medium that manages the handling of machine checks in a logical-partitioned server operating under the control of a system controller, said logical-partitioned server having plural partitions, said computer program product comprising:

computer-readable means for providing a discrete lockable access corridor between each said partition and said system controller, the locked/unlocked state of each discrete lockable access corridor being controlled by its associated partition;

computer-readable means for providing a global lock associated with said system controller;

computer-readable means for locking said global lock and the discrete lockable access corridor associated with a first of said plural partitions when an operating system (OS) associated with said first of said plural partitions issues a machine-check interrupt;

computer-readable means for performing a first machine check analysis based on said machine check interrupt issued by said OS of said first partition; and computer-readable means for unlocking said global lock by said system controller upon completion of said first machine check analysis, regardless of the locked/unlocked state of any of said discrete lockable access corridors.

15. A computer program product as set forth in claim 14, further comprising:

computer-readable means for locking the discrete access corridor associated with a second of said plural partitions when an OS associated with said second partition issues a machine-check interrupt;

computer-readable means for determining the locked/unlocked state of said global lock; and computer-readable means for locking said global lock if said global lock is determined to be unlocked, thereby connecting said second partition and said system controller along the discrete access corridor associated with said second partition;

computer-readable means for performing a second machine check analysis based on said machine check interrupt issued by said OS of said second partition; and computer-readable means for unlocking said global lock upon completion of said second machine check analysis, regardless of the locked/unlocked state of any of said discrete lockable access corridors.

16. A computer program product as set forth in claim 15, wherein said system controller comprises a hypervisor.

17. An apparatus for managing the handling of machine checks in a logical-partitioned server operating under the control of a system controller, said logical-partitioned server having plural partitions, said apparatus comprising:

a discrete lockable access corridor between each of said plural partitions and said system controller, the locked/unlocked state of each discrete lockable access corridor being controlled by its associated partition;

a global lock associated with said system controller;

an instruction processor executing instructions which lock said global lock and the discrete lockable access corridor associated with a first of said plural partitions when an operating system (OS) associated with said first of said plural partitions issues a machine-check interrupt;

a hardware processor performing a first machine check analysis based on said machine check interrupt issued by said OS of said first partition; and an instruction processor configured with instructions for said system controller to unlock said global lock upon completion of said first machine check analysis, regardless of the locked/unlocked state of any of said discrete lockable access corridors.

* * * * *